US011958285B2

(12) United States Patent
Shimoda

(10) Patent No.: US 11,958,285 B2
(45) Date of Patent: Apr. 16, 2024

(54) PRINTER

(71) Applicant: BROTHER KOGYO KABUSHIKI KAISHA, Nagoya (JP)

(72) Inventor: Koshiro Shimoda, Tokoname (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 81 days.

(21) Appl. No.: 17/876,454

(22) Filed: Jul. 28, 2022

(65) Prior Publication Data

US 2023/0029883 A1 Feb. 2, 2023

(30) Foreign Application Priority Data

Jul. 29, 2021 (JP) ................................ 2021-124550

(51) Int. Cl.
*B41J 11/00* (2006.01)
*B41J 29/377* (2006.01)

(52) U.S. Cl.
CPC ........ *B41J 11/0045* (2013.01); *B41J 11/0024* (2021.01); *B41J 29/377* (2013.01)

(58) Field of Classification Search
CPC .... B41J 11/0045; B41J 11/0024; B41J 29/377
See application file for complete search history.

(56) References Cited

U.S. PATENT DOCUMENTS

2017/0080718 A1 3/2017 Nohara

FOREIGN PATENT DOCUMENTS

CN 102145594 A * 8/2011 ............ B41J 15/042
JP 2017-56703 A 3/2017

* cited by examiner

*Primary Examiner* — Justin Seo
(74) *Attorney, Agent, or Firm* — KENEALY VAIDYA LLP

(57) ABSTRACT

A printer includes a platen roller, a substrate, a heating element, a first defining part, and a second defining part. The platen roller conveys a medium in a conveyance direction. The substrate has a front surface which faces the platen roller in a facing direction intersecting an axis direction of the platen roller and the conveyance direction. The heating element is provided on the front surface of the substrate. The heat sink is in contact with a back surface of the substrate. The first defining part and the second defining part define the conveyance path. The first defining part is provided on a further upstream side than the heating element in the conveyance direction. The second defining part is provided at the heat sink on a further downstream side than the substrate in the conveyance direction. and has a contact surface with which the medium comes into contact.

8 Claims, 8 Drawing Sheets

PRINTER

REFERENCE TO RELATED APPLICATIONS

This application claims priority from Japanese Patent Application No. 2021-124550 filed on Jul. 29, 2021. The entire content of the priority application is incorporated herein by reference.

BACKGROUND ART

A printer includes a platen roller and a thermal line head. The platen roller conveys a medium and presses the medium against the thermal line head at a part facing the thermal line head. The thermal line head performs printing on the medium pressed by the platen roller. In the printer, a guide member is provided on a further upstream side than the facing part in a conveyance direction of the medium. The guide member is located on a further platen roller-side than the thermal line head. The guide member forms an introduction angle of the medium into the part facing the thermal line head.

Since the introduction angle is formed in the printer, a position where the medium comes into contact with the thermal line head may deviate from the facing part in the conveyance direction, depending on rigidity of the medium. For this reason, the printer may have a difference in print quality due to a difference in rigidity of the medium.

DESCRIPTION

An object of the present disclosure is to provide a printer capable of suppressing a difference in print quality due to a difference in rigidity of a medium.

A printer 1 in accordance with an embodiment of the present disclosure will be described with reference to the drawings. In the below, the left lower, the right upper, the left upper, the right lower, the upper, and the lower of FIG. 1 are referred to as the front, the rear, the left, the right, the upper, and the lower of the printer 1, respectively.

Figure 1:
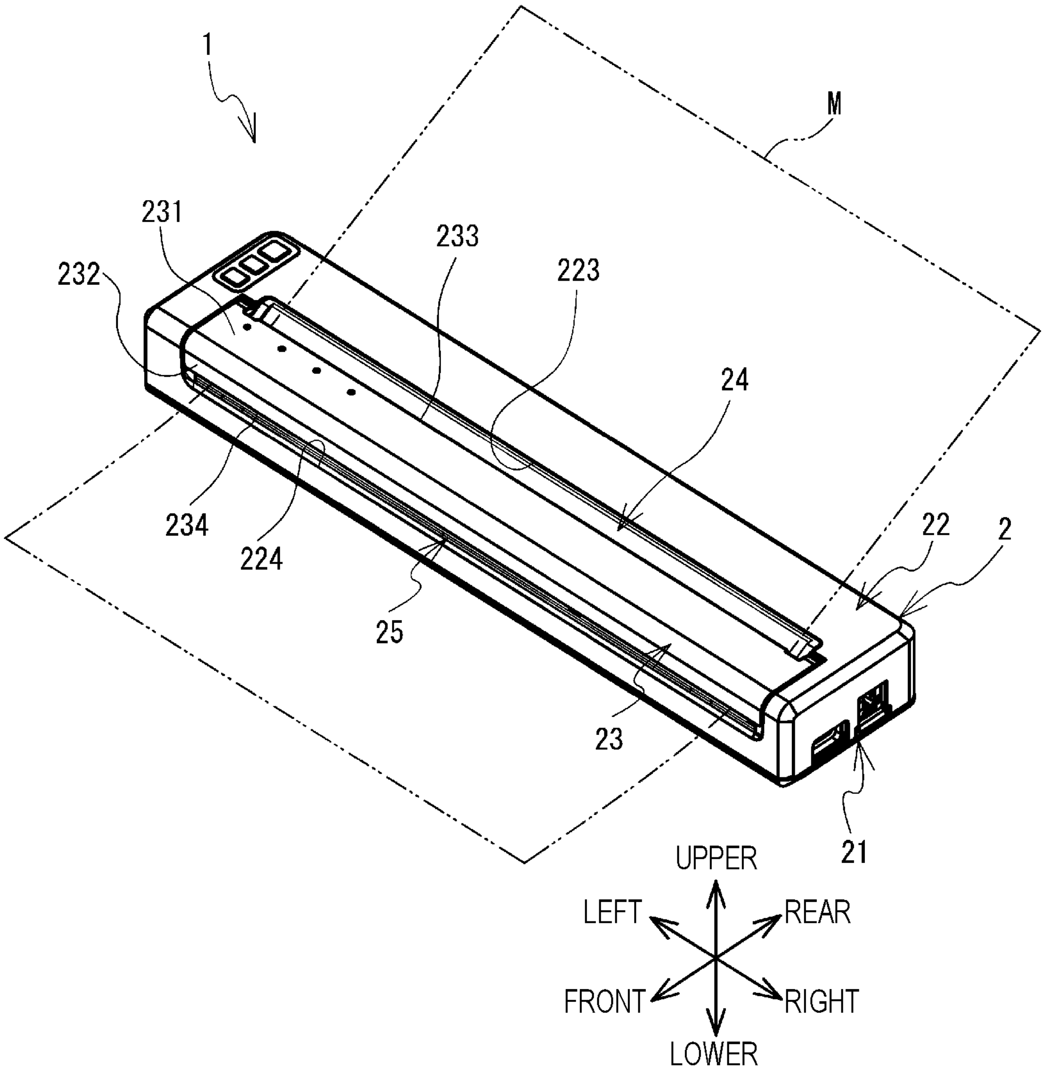
FIG. 1 is a perspective view of a printer 1.

The printer 1 shown in FIG. 1 can print an image on a medium M, based on print data. The medium M is not limited to a specific medium, but has, for example, a sheet or tape shape, and in the present embodiment, is a heat-sensitive type cut sheet. The printer 1 can perform printing on a plurality of types of media M having different rigidity from each other. The rigidity of the medium M is different depending on, for example, a material of the medium M, and becomes higher as the medium M becomes thicker.

Figure 2:
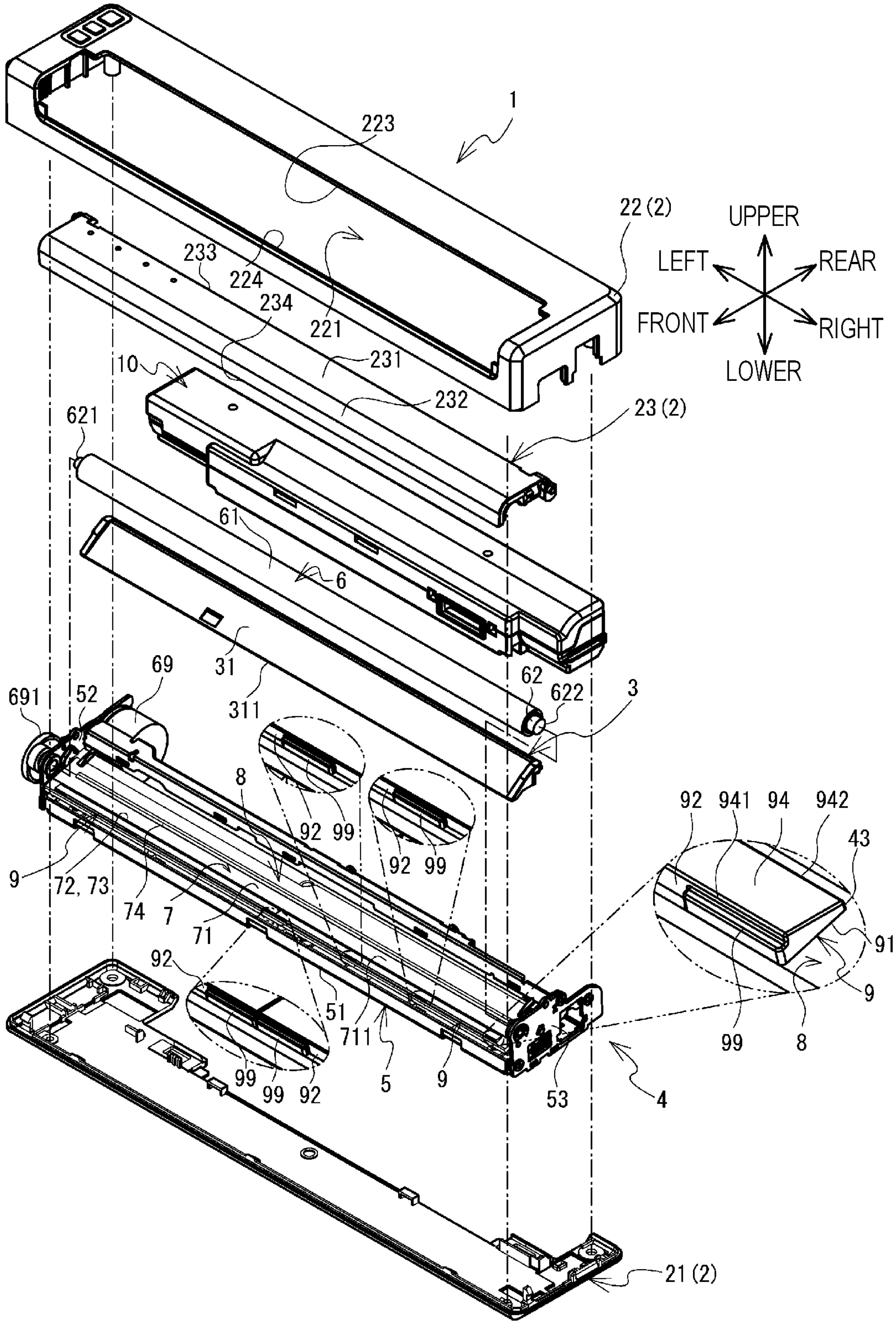
FIG. 2 is an exploded perspective view of the printer 1.

An appearance configuration of the printer 1 is described with reference to FIGS. 1 and 2. As shown in FIG. 1, the printer 1 has a case 2. The case 2 has a cuboid shape and is longer in a right and left direction than in a front and rear direction and in an upper and lower direction. A battery 10 shown in FIG. 2 is mounted to a rear lower part of the case 2. The battery 10 supplies power to the printer 1.

As shown in FIG. 2, the case 2 includes a lower cover 21, an upper cover 22, and an opening/closing cover 23. The lower cover 21 has a plate shape and extends in the front and rear and right and left directions. The lower cover 21 forms a lower part of the case 2. The upper cover 22 opens downward and is attached to an upper side of the lower cover 21. The upper cover 22 is formed with an opening 221. The opening 221 extends from a central portion to an upper end in the upper and lower direction, on a front surface of the upper cover 22. The opening 221 extends from a front end to a central portion in the front and rear direction, on an upper surface of the upper cover 22. The opening 221 extends from a vicinity of a left end to a vicinity of a right end in the upper cover 22. In the following, an end portion of the upper cover 22 that defines a rear end of the opening 221 is referred to as "opening end 223", and an end portion of the upper cover 22 that defines a lower end of the opening 221 is referred to as "opening end 224".

The opening/closing cover 23 has a plate shape and includes a first portion 231 and a second portion 232. The first portion 231 extends in the front and rear and right and left directions. The second portion 232 extends downwardly from a front end of the first portion 231 and also extends in the right and left direction. The opening/closing cover 23 fits into the opening 221. A rear end 233 of the first portion 231 is rotatably supported by the upper cover 22. For this reason, the opening/closing cover 23 can be opened/closed with respect to the opening 221 by swinging with the rear end 233 of the first portion 231 as a shaft.

In the below, as shown in FIG. 1, a state in which the opening/closing cover 23 is closed with respect to the opening 221 is described as a reference. In this case, the rear end 233 of the first portion 231 faces the opening end 223 of the upper cover 22 with a gap in the front and rear direction. In addition, a rear end 234 of the second portion 232 faces the opening end 224 of the upper cover 22 with a gap in the upper and lower direction.

An upper surface of the case 2 is formed with an insertion slot 24. The insertion slot 24 is an opening and is defined by the opening end 223 of the upper cover 22 and the rear end 233 of the opening/closing cover 23. The medium M is supplied into the case 2 from the insertion slot 24.

A front surface of the case 2 is formed with a discharge slot 25. The discharge slot 25 is an opening and is defined by the opening end 224 of the upper cover 22 and the lower end 234 of the opening/closing cover 23. The medium M is discharged from the discharge slot 25 to an outside of the case 2 after being printed inside the case 2.

Figure 3:
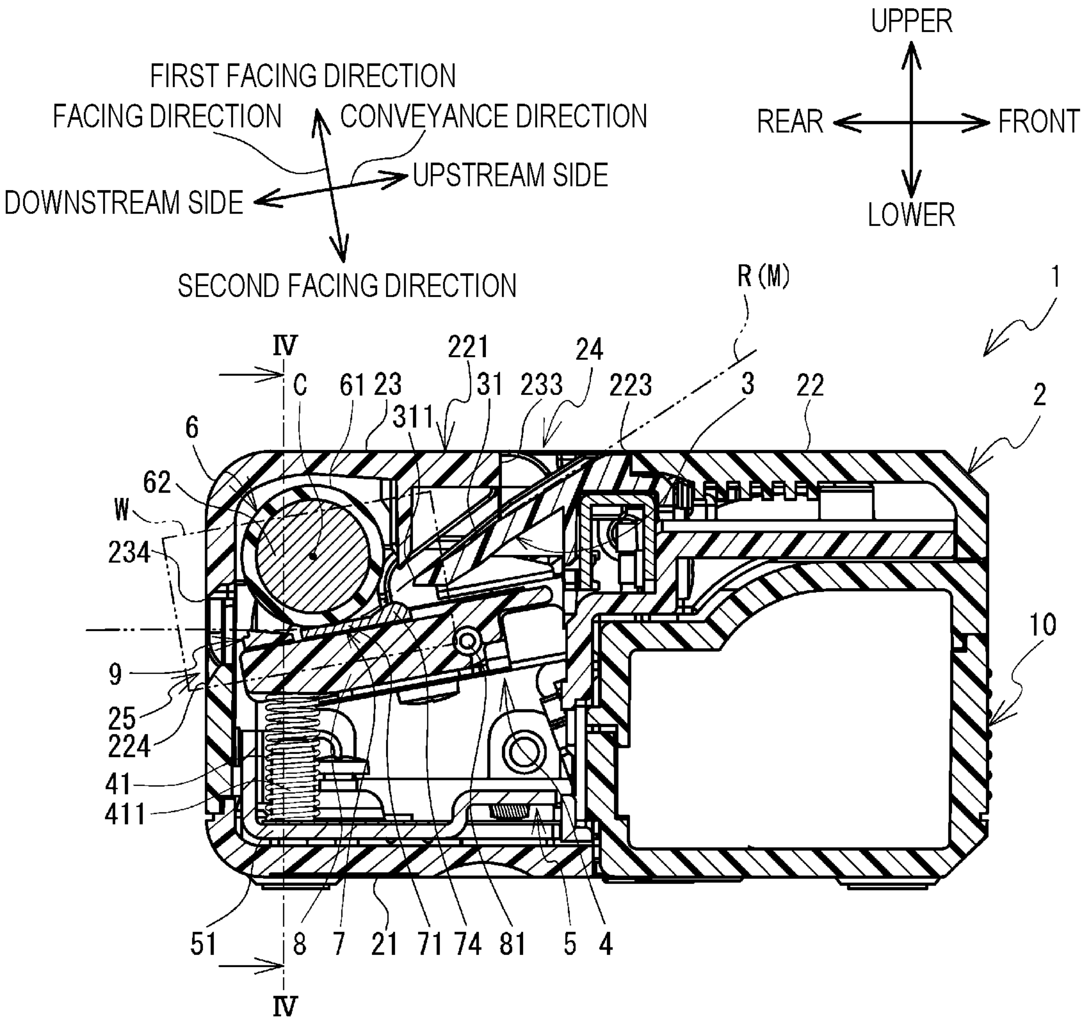
FIG. 3 is a cross-sectional view taken along an arrow direction of an IV-IV line shown in FIG. 4.
Figure 4:
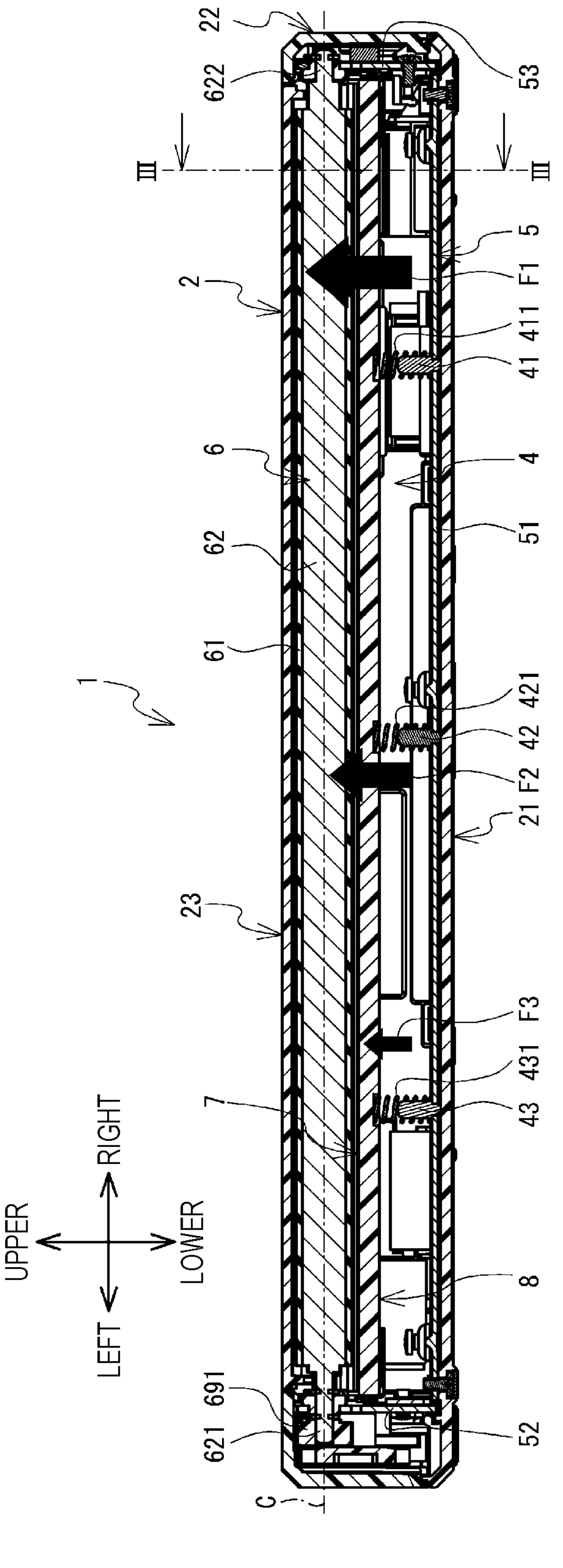
FIG. 4 is a cross-sectional view taken along an arrow direction of an III-III line shown in FIG. 3.

An internal configuration of the printer 1 is described with reference to FIGS. 2 to 7. As shown in FIGS. 2 to 4, the printer 1 includes a head unit 4. The head unit 4 is accommodated in the case 2, and includes a support plate 5, a platen roller 6, a thermal head 7, and a heat sink 8. The support plate 5 includes a lower plate 51, a left plate 52, and a right plate 53. The lower plate 51 has a rectangular shape, as seen from above, and is longer in the right and left direction than in the front and rear direction. The lower plate 51 is fixed to an upper surface of the lower cover 21. The left plate 52 extends upward from a left end of the lower plate 51 and also extends in the front and rear direction. The right plate 53 extends upward from a right end of the lower plate 51 and also extends in the front and rear direction. The left plate 52 and the right plate 53 face each other in the right and left direction.

Figure 5:
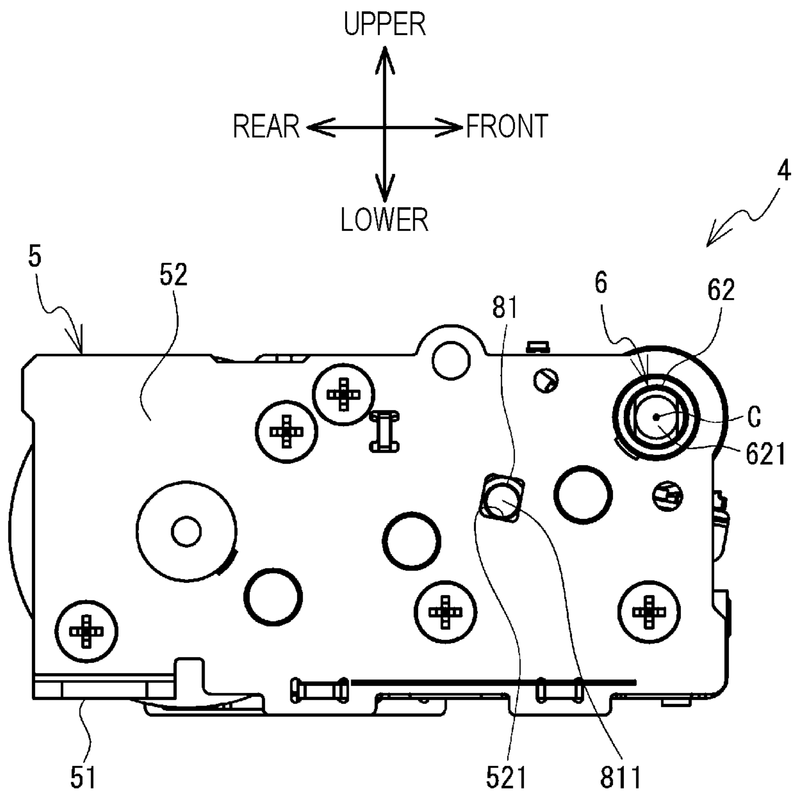
FIG. 5 is a left side view of a head unit 4.
Figure 6:
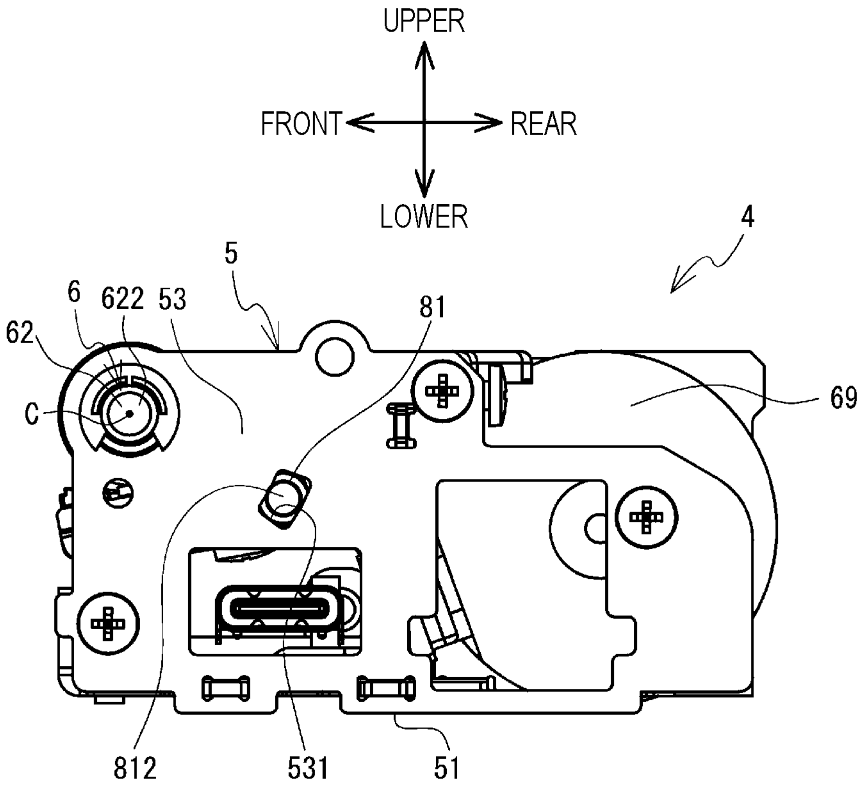
FIG. 6 is a right side view of the head unit 4.

The platen roller 6 is provided at an oblique front upper inside the case 2 (refer to FIG. 3) and extends in the right and left direction. The platen roller 6 includes a cylindrical part 61 and a shaft 62. The cylindrical part 61 is an elastic body and is made of rubber or the like. The shaft 62 penetrates an inside of the cylindrical part 61 and is fixed to the cylindrical part 61. As shown in FIGS. 4 and 5, a left end 621 of the shaft 62 is supported by the left plate 52. As shown in FIGS. 4 and 6, a right end 622 of the shaft 62 is supported by the right plate 53. The platen roller 6 can rotate about the shaft 62.

As shown in FIG. 2, the platen roller 6 is connected to a motor 69 via a gear 691 or the like. The motor 69 is fixed to a rear lower part on a right surface of the left plate 52. The gear 691 is supported by the left plate 52 on a left side of the left plate 52. Note that, the gear 691 is not shown in FIG. 5. The motor 69 drives to rotate the platen roller 6 via, the gear 691.

As shown in FIGS. 3 and 4, a rotation center C of the platen roller 6 passes through a center of the shaft 62 and extends in the right and left direction. As shown in FIG. 3, the platen roller 6 rotates around the rotation center C to convey the medium M in a conveyance direction. The conveyance direction is a direction in which the medium M is conveyed by the platen roller 6, and is orthogonal to the right and left direction. In the present embodiment, the conveyance direction extends obliquely upward and rearward and obliquely downward and forward. In the below, the oblique rear upper side of the conveyance direction is referred to as an upstream side, and the oblique front lower side is referred to as a downstream side. A direction orthogonal to the right and left direction and the conveyance direction is referred to as a facing direction. In the present embodiment, the facing direction extends obliquely upward and forward and obliquely downward and rearward. The oblique front upper direction of the facing direction is referred to as a first facing direction, and the oblique rear lower direction is referred to as a second facing direction.

Figure 7:
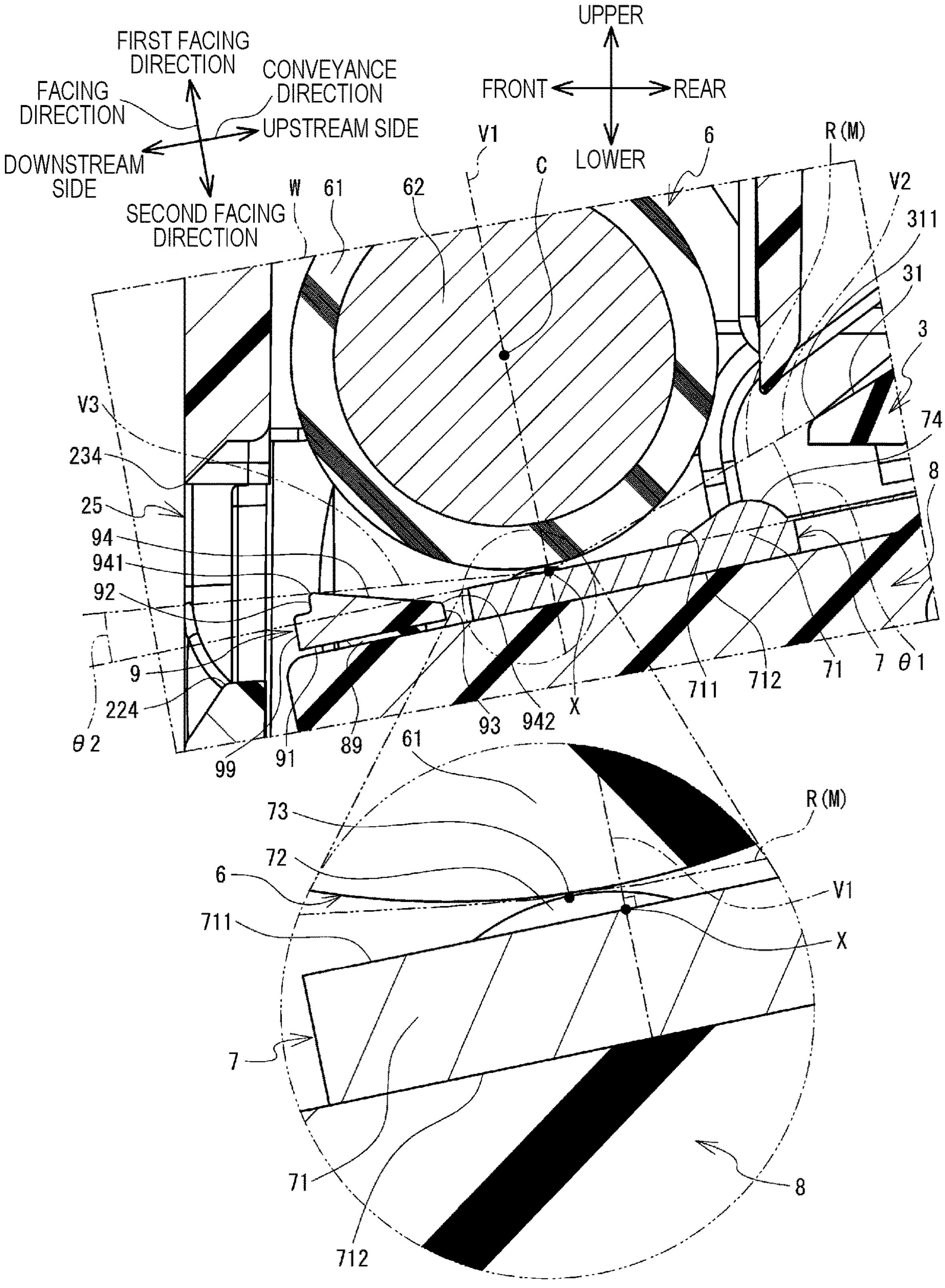
FIG. 7 is an enlarged view of an area W shown in FIG. 3.

As shown in FIG. 7, the thermal head 7 is provided in the second facing direction of the platen roller 6. The thermal head 7 is a line head and includes a substrate 71, a mold 72, a plurality of heating elements 73, and a driver IC 74. The substrate 71 extends in the right and left direction and the conveyance direction so as to be orthogonal to the facing direction.

The substrate 71 has a front surface 711 and a back surface 712. The front surface 711 faces toward the first facing direction and faces the platen roller 6 with a conveyance path R interposed therebetween in the facing direction. The back surface 712 faces opposite to the front surface 711 in the facing direction, i.e., faces toward the second facing direction. Note that, in the present embodiment, “a surface faces toward a specific direction” does not necessarily mean that the surface extends so as to be orthogonal to the specific direction, but means that the surface extends so as to intersect at least the specific direction. In the present embodiment, the front surface 711 and the back surface 712 extend so as to be orthogonal to the facing direction.

The mold 72 and the plurality of heating elements 73 are provided on the front surface 711 of the substrate 71. The mold 72 is convex upward from the front surface 711. A height of the mold 72 from the front surface 711 in the facing direction is smaller than a length of the mold 72 in the conveyance direction. As shown in FIG. 2, the mold 72 extends in the right and left direction from the vicinity of the left end to the vicinity of the right end of the substrate 71. The mold 72 is a base for fixing the heating elements 73 to the substrate 71.

As shown in FIG. 7, the plurality of heating elements 73 are fixed to an apex of the mold 72 in the first facing direction and are arranged side by side in the right and left direction. A virtual line V1 passes through the rotation center C and also extends in the facing direction. The plurality of heating elements 73 are located on a further downstream side than an intersection X of the virtual line V1 and the front surface 711 in the conveyance direction. A distance between the intersection X and the heating element 73 in the conveyance direction is smaller than a half of an outer diameter of the cylindrical part 61. A length of the heating element 73 in the conveyance direction is smaller than the length of the mold 72 in the conveyance direction. The plurality of heating elements 73 are configured to come into contact with the medium M pressed against the front surface 711 by the platen roller 6, and to generate heat, thereby performing, printing on the medium M.

The driver IC 74 protrudes from an upstream end of the front surface 711 in the conveyance direction to the extent that it does not contact the platen roller 6 in the first facing direction. As shown in FIG. 2, the driver IC 74 extends in the right and left direction. The driver IC 74 selectively causes the plurality of heating elements 73 to generate heat, based on print data.

As shown in FIGS. 3 and 7, the heat sink 8 is provided in the second facing direction of the thermal head 7, and is in contact with the back surface 712 of the substrate 71. That is, the heat sink 8 supports the substrate 71. The heat sink 8 has a plate shape and releases heat generated as a result of heat generation of the plurality of heating elements 73. The heat sink 8 extends in the right and left direction and the conveyance direction so as to be orthogonal to the facing direction. In the present embodiment, the heat sink 8 extends from the vicinity of the right side of the left plate 52 to the vicinity of the left side of the right plate 53. The heat sink 8 extends from a further upstream side than the rotation center C of the platen roller 6 in the conveyance direction to a further downstream side than the rotation center C of the platen roller 6 in the conveyance direction. Specifically, the heat sink 8 extends in the conveyance direction from a further upstream side than an outer peripheral surface of the cylindrical part 61 in the conveyance direction to a further downstream side than the outer peripheral surface of the cylindrical part 61 in the conveyance direction.

A shaft 81 is fixed to a rear end of the heat sink 8. The shaft 81 is located on a further upstream side than the rotation center C of the platen roller 6 in the conveyance direction, and is located in the second direction further than the rotation center C of the platen roller 6. The shaft 81 extends in the right and left direction.

As shown in FIG. 5, the left plate 52 is formed with a support hole 521 at an oblique rear lower position with respect to the shaft 62. The support hole 521 has a rectangular shape, as seen from the left side surface. A left end 811 of the shaft 81 is arranged in the support hole 521. Thereby, the left plate 52 rotatably supports the left end 811 of the shall 81. For this reason, the heat sink 8 can swing about the shaft 81.

As shown in FIG. 6, the right plate 53 is formed with a support hole 531 at an oblique rear lower position with respect to the shaft 62. The support hole 531 has an arc shape whose center is on the rotation center C of the platen roller 6, as seen from the right side surface. An upper end of the support hole 531 is located at the same position as an upper end of the support hole 521 shown in FIG. 5. A lower end of the support hole 531 is located below a lower end of the support hole 521 shown in FIG. 5. A right end 812 of the shaft 81 is arranged in the support hole 531. Since the lower end of the support hole 531 is located below the lower end of the support hole 521, a gap is formed between the right end 812 of the shaft 81 and the lower end of the support hole 521. Therefore, the right end 812 of the shaft 81 is a free end.

As shown in FIG. 4, compression coils springs 41, 42 and 43 are provided in the case 2. The compression coil springs 41, 42 and 43 are arranged side by side at equal intervals in the right and left direction and extend in the upper and lower direction, respectively. The compression coil spring 41 is located at the midpoint between the center and the right end of the heat sink 8 in the right and left direction. The compression coil spring 42 is located at the center of the heat sink 8 in the right and left direction, and is located on the left side of the compression coil spring 41. The compression coil spring 43 is located at the midpoint between the center and the left end of the heat sink 8 in the right and left direction, and is located on the left side of the compression coil spring 42. The compression coil springs 41, 42 and 43 are mounted on shafts 411, 421 and 431, respectively. The shafts 411, 421, and 431 each extend upward from the lower plate 51 to a side below the heat sink 8.

The compression coil springs 41, 42 and 43 are arranged at the same position each other in the front and rear direction. Therefore, in FIG. 3, only the compression coil spring 41 among the compression coil springs 41, 42 and 43 is shown. As shown in FIGS. 3 and 4, the upper ends of the compression coil springs 41, 42 and 43 are each in contact with a portion of the lower surface of the heat sink 8 on the further downstream side than the rotation center C of the platen roller 6 in the conveyance direction. Therefore, the compression coil springs 41, 42 and 43 urge the heat sink 8 so that the heat sink 8 swings about the shaft 81 in a clockwise direction, as seen from the right side surface.

According to the above configuration, when the opening/closing cover 23 is opened with respect to the opening 221, the heat sink 8 swings about the shaft 81 in a counterclockwise direction, as seen from the right side surface, against the urging forces of the compression coil springs 41, 42 and 43 by a cam mechanism (not shown). Thereby, the thermal head 7 is separated from the platen roller 6 in the second facing direction.

When the opening/closing cover 23 is closed with respect to the opening 221, the heat sink 8 swings about the shaft 81 in the clockwise direction, as seen from the right side surface 81, by the cam mechanism (not shown). Thereby, the thermal head 7 comes close to the outer peripheral surface of the cylindrical part 61 of the platen roller 6. The platen roller 6 is pressed against the thermal head 7 by the urging forces of the compression coil springs 41, 42 and 43.

As shown in FIG. 4, in the present embodiment, a pressing load F2 of the compression coil spring 42 is larger than a pressing load F3 of the compression coil spring 43. A pressing load F1 of the compression coil spring 41 is larger than the pressing load F2 of the compression coil spring 42. That is, the plurality of compression coil springs 41, 42 and 43 are configured so that the pressing load increases as the position where the compression coil spring is arranged is further away rightward from the left end 811 of the shaft 81 and is closer to the right end 812.

As shown in FIGS. 2, 3 and 7, the printer 1 includes a first defining member 3 and two second defining members 9. The first defining member 3 is provided on a further upstream side than the plurality of heating elements 73 in the conveyance direction, and is located below the insertion slot 24 in the case 2. The first defining member 3 has a plate shape, extends in the right and left direction, and also extends obliquely forward and downward from the opening end 223 of the upper cover 22. The first defining member 3 defines a path on a further upstream side of the conveyance path R than the intersection X in the conveyance direction (refer to FIG. 7).

The first defining member 3 includes a contact surface 31. The contact surface 31 faces toward the first facing direction. The contact surface 31 extends in the right and left direction so as to intersect both the conveyance direction and the facing direction, and also extends from the first facing direction toward the second facing direction as being directed from the upstream side toward the downstream side in the conveyance direction. A downstream end 311 of the contact surface 31 in the conveyance direction is located in the first facing direction further than the driver IC 74 and on the further upstream side than the driver IC 74 in the conveyance direction.

The two second defining members 9 are provided on a further downstream side than the substrate 71 in the conveyance direction on the upper surface of the heat sink 8, and are located behind the discharge slot 25 in the case 2. The two second defining members 9 are the same members and are arranged side by side in the right and left direction (refer to FIG. 2). The two second defining members 9 define a path on a further downstream side of the conveyance path R than the intersection X in the conveyance direction (refer to FIG. 7).

As shown in FIGS. 2 and 7, the second defining member 9 is formed into a trapezoidal shape by a fixed surface 91, a downstream surface 92, an upstream surface 93 and a contact surface 94, as seen from a side. As shown in FIG. 7, the fixed surface 91 faces toward the second facing direction. The fixed surface 91 extends in the right and left direction and the conveyance direction so as to be orthogonal to the facing direction. The fixed surface 91 is fixed to the upper surface of the heat sink 8 via a double-sided adhesive tape 89.

The downstream surface 92 extends in the first facing direction from a downstream end, in the conveyance direction, of the fixed surface 91 to a position in the first facing direction further than the front surface 711. The downstream surface 92 faces toward the downstream side in the conveyance direction and extends in the right and left direction and the facing direction so as to be orthogonal to the conveyance direction.

The upstream surface 93 extends in the first facing direction from an upstream end, in the conveyance direction, of the fixed surface 91 to a position in the second facing direction further than the front surface 711. The upstream surface 93 faces toward the upstream side in the conveyance direction and extends in the right and left direction and the facing direction so as to be orthogonal to the conveyance direction.

The contact surface 94 extends from an end of the upstream surface 93 in the first facing direction to an end of the downstream surface 92 in the first facing direction. The contact surface 94 faces toward the first facing direction. The contact surface 94 extends in the right and left direction so as to intersect both the conveyance direction and the facing direction, and also extends from the second facing direction toward the first facing direction as being directed from the upstream side toward the downstream side in the conveyance direction. An upstream end 942 of the contact surface 94 in the conveyance direction is located in the second facing direction further than the front surface 711, and a downstream end 941 of the contact surface 94 in the conveyance direction is located in the first facing direction further than the front surface 711. In the present embodiment, the downstream end 941 of the contact surface 94 is located at the same position as the discharge slot 25 in the facing direction, i.e., between the opening end 224 of the upper cover 22 and the lower end 234 of the opening/closing cover 23.

As shown in FIG. 2, the first defining member 9 is provided with a plurality of (four, in the present embodiment) protrusions 99. The plurality of protrusions 99 protrude from the downstream surface 92 toward a downstream side in the conveyance direction, and are arranged side by side at equal intervals in the right and left direction. Downstream ends of the plurality of protrusions 99 in the conveyance direction are located at the same positions in the conveyance direction, and are located on a further upstream side, in the conveyance direction, than a downstream end, in the conveyance direction, of the heat sink 8.

The conveyance path R is described with reference to FIGS. 3 and 7. As shown in FIG. 3, the conveyance path R extends obliquely forward and downward from the insertion slot 24 along the contact surface 31 of the first defining member 3. The conveyance path R extends from the downstream end 311 of the contact surface 31 of the first defining member 3 to between the platen roller 6 and the thermal head 7. The conveyance path R passes in the first facing direction further than the driver IC 74. That is, the first defining member 3 defines the conveyance path R so that the medium M does not come into contact with the driver IC 74 on the further upstream side than the intersection X in the conveyance direction.

As shown in FIG. 7, the conveyance path R extends from between the platen roller 6 and the thermal head 7 toward the downstream end 941 of the contact surface 94. That is, the conveyance path R extends from between the platen roller 6 and the thermal head 7 from the second facing direction toward the first facing direction as being directed from the upstream side toward the downstream side in the conveyance direction. The conveyance path R extends forward from the downstream end 941 of the contact surface 94 to the discharge slot 25.

An introduction angle θ1 and a discharge angle θ2 are described with reference to FIG. 7. In the below, a virtual line passing through the intersection X and the downstream end 311 of the contact surface 31 is referred to as a "virtual line V2", and a virtual line passing through the intersection X and the downstream end 941 of the contact surface 94 is referred to as a "virtual line V3". The virtual line V2 substantially coincides with the path on the further upstream side of the conveyance path R than the intersection X in the conveyance direction. The virtual line V3 substantially coincides with the path on the further downstream side of the conveyance path R than the intersection X in the conveyance direction.

The introduction angle θ1 is an angle of the virtual line V2 with respect to the front surface 711, and is defined by the downstream end 311 of the contact surface 31. The introduction angle θ1 is greater than 0° and smaller than 90°. The discharge angle θ2 is an angle of the virtual line V3 with respect to the front surface 711, and is defined by the downstream end 941 of the contact surface 94. The discharge angle θ2 is greater than 0° and smaller than 90°. In the present embodiment, the discharge angle θ2 is smaller than the introduction angle θ1.

In the below, when the introduction angle θ1 is larger than 0°, it is referred to as "the introduction angle θ1 is formed", and when the discharge angle θ2 is larger than 0°, it is referred to as "the discharge angle θ2 is formed." That is, the description that the introduction angle θ1 or the discharge angle θ2 is not formed means that the introduction angle θ1 or the discharge angle θ2 is 0°, i.e., the virtual line V2 or the virtual line V3 coincides with the front surface 711.

A printing operation by the printer 1 is described with reference to FIGS. 3, 7 and 8. As shown in FIG. 3, a user inserts the medium M from the insertion slot 24 into the case 2 along the conveyance path R. A downstream end of the medium M is arranged between the platen roller 6 and the thermal head 7 in the facing direction. The printer 1 drives the motor 69 shown in FIG. 2 to rotate the platen roller 6 in the clockwise direction, as seen from the right side surface. Thereby, the medium M is conveyed along the conveyance path R from the upstream side toward the downstream side in the conveyance direction. In this case, as shown in FIG. 7, the downstream end of the medium M is conveyed to the downstream side in the conveyance direction along the substrate 71, and comes into contact between the upstream end 942 and the downstream end 941 of the contact surface 94 in the conveyance direction. The downstream end of the medium M is conveyed toward the downstream end 941 on the contact surface 94.

The downstream end of the medium M passes through the downstream end 941 of the contact surface 94 and is then discharged from the discharge slot 25 along the conveyance path R. Since the downstream surface 92 extends so as to be orthogonal to the conveyance direction, the downstream end of the medium M does not come into contact with the downstream surface 92 even if it hangs down after passing through the downstream end 941 of the contact surface 94. Therefore, the downstream end 941 of the contact surface 94 is located on the most downstream side, in the conveyance direction, of the portion of the second defining member 9 with Which the medium M comes into contact.

Figure 8:
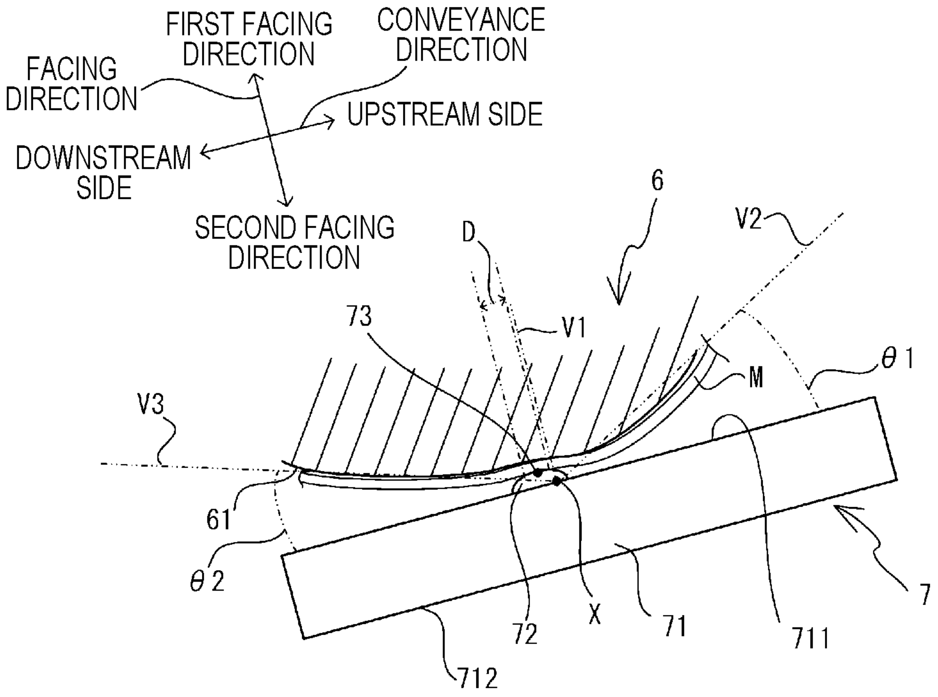
FIG. 8 is a schematic view corresponding to FIG. 7.

As shown in FIG. 8, since the cylindrical part 61 of the platen roller 6 is an elastic body, the platen roller 6 is pressed against the thermal head 7 with the medium M interposed therebetween, so that the pressed portion of the cylindrical part 61 is deformed to be squashed in the first facing direction. Therefore, the medium M does not come into point contact with the thermal head 7 in the conveyance direction, but comes into surface contact with the thermal head 7 with a width D. The width D indicates a contact range between the thermal head 7 and the medium M in the conveyance direction. The printer 1 selectively causes the plurality of heating elements 73 to generate heat under control of the driver IC 74 while conveying the medium M along the conveyance path R. Thereby, printing is performed on the medium M.

An example of a method of fixing the second defining member 9 to the heat sink 8 is described with reference to FIG. 2. An operator arranges the head unit 4 on a jig (not shown). In this case, a pressing surface of the jig extends in the right and left direction at a position of the downstream end, in the conveyance direction, on the upper surface of the heat sink 8. The operator presses tip ends of the plurality of protrusions 99 against the pressing surface of the jig from the upstream side in the conveyance direction, in a state where the fixed surface 91 faces the upper surface of the heat sink 8 in the facing direction. Thereby, the operator fixes the second defining member 9 to the heat sink 8 via the double-sided adhesive tape 89 shown in FIG. 7 while pressing the respective tip ends of the plurality of protrusions 99 against the pressing surface of the jig. For this reason, the operator can fix the second defining member 9 to the heat sink 8 so that the second defining member 9 is not warped in the conveyance direction. Further, the operator can fix the second defining member 9 to the heat sink 8 so that the second defining member 9 does not deviate from a target fixing position to the heat sink 8 in the conveyance direction.

As described above, in the above embodiment, the printer 1 forms the introduction angle θ1 by the first defining member 3. Since the introduction angle θ1 is formed, the printer can suppress the medium M from coming into contact with the convex shape of the substrate 71, for example, the driver IC 74 on the further upstream side than the intersection X in the conveyance direction. Therefore, the printer 1 can suppress the medium M or the driver IC 74 from being damaged due to the contact between the medium M and the driver IC 74.

When the introduction angle θ1 is formed, a conveyance aspect of the medium M is as follows. That is, as the rigidity of the medium M is higher, the cylindrical part 61 is pressed and squashed by the medium M in the vicinity of the upstream side of the intersection X in the conveyance direction. For this reason, in the vicinity of the upstream side of the intersection X in the conveyance direction, the higher the rigidity of the medium M is, the medium M is located in the direction further away from the substrate 71 in the first facing direction and therefore the width D shown in FIG. 4 becomes smaller. Therefore, if the printer 1 does not include the second defining member 9, the discharge angle θ2 is not formed, so that, as the rigidity of the medium M becomes higher, the position (width D) where the medium M comes into contact with the thermal head 7 easily deviates from the intersection X toward the downstream side in the conveyance direction.

In the above embodiment, the printer 1 forms the discharge angle θ2 by the second defining member 9. For this reason, the cylindrical part 61 is pressed and squashed by the medium M even in the vicinity of the downstream side of the intersection X in the conveyance direction. In this way, the cylindrical part 61 is pressed and squashed by the medium M both in the vicinity of the upstream side and in the vicinity of the downstream side in the conveyance direction, centering around the intersection X. For this reason, even when the rigidity of the medium M is high, the printer 1 can correct the position (width D) where the medium M comes into contact with the thermal head 7 to the upstream side in the conveyance direction. Therefore, the printer 1 can suppress the position (width D) where the medium M comes into contact with the thermal head 7 from deviating in the conveyance direction by the second defining member 9. Therefore, the printer 1 can suppress difference in print quality due to difference in rigidity of the medium M.

In the above embodiment, both the substrate 71 and the second defining member 9 are directly fixed to the heat sink 8. Therefore, the printer 1 can suppress variation in the discharge angle θ2 due to the attaching variation of the second defining member 9.

In the above embodiment, the upstream end 942 of the contact surface 94 is located in the second facing direction further than the front surface 711. For this reason, the downstream end of the medium M is conveyed along the contact surface 94 without colliding with the upstream surface 93 of the second defining member 9. Therefore, the printer 1 can suppress occurrence of jam at the time of conveying the medium M.

In the above embodiment, the downstream end 941 of the contact surface 94 is located on the most downstream side, in the conveyance direction, of the portion of the second defining member 9 with which the medium M comes into contact. For this reason, a distance in the conveyance direction from the position (width D) where the medium M comes into contact with the thermal head 7 to the downstream end 941 of the contact surface 94 increases. Therefore, the printer 1 can suppress the deviation of the position (width D) where the medium M comes into contact with the thermal head 7, which is caused due to the dimensional variation of the second defining member 9 in the facing direction.

The second defining member 9 is provided on the heat sink 8 separately from the heat sink 8. For this reason, the printer 1 can adjust the position (width D) where the medium M comes into contact with the thermal head 7 by changing the design of the second defining member 9 without changing the design of the heat sink 8. Therefore, even when the type of medium M supported by the printer 1 is different depending on the model, the configuration of the heat sink 8 can be made in common, regardless of the model.

In the above embodiment, the protrusion 99 is provided at the second defining member 9. For this reason, for example, when the second defining member 9 is attached to the heat sink 8, the protrusion 99 is used as a reference, so that the attaching operation becomes easy. Further, the operator can suppress the second defining member 9 from being warped in the conveyance direction by pressing the plurality of protrusions 99 against the jig and fixing them to the heat sink 8.

In the above embodiment, the pressing load F2 of the compression coil spring 42 is larger than the pressing load. F3 of the compression coil spring 43, and the pressing load F1 of the compression coil spring 41 is larger than the pressing load F2 of the compression coil spring 42. For this reason, the printer 1 can suppress a difference in amount of deformation of the heat sink 8 in the facing direction at each position in the right and left direction. Therefore, the printer 1 can suppress difference in print quality in the right and left direction. Further, the printer 1 does not need to increase the entire pressing load of the compression coil springs 41, 42 and 43 so as to suppress the difference in amount of deformation. Therefore, the drive force of the motor 69 can be reduced, and the motor 69 can be miniaturized. As a result, the printer 1 can be made small as a whole.

As the discharge angle θ2 becomes larger, the medium M is more likely to be curled on the further downstream side than the intersection X in the conveyance direction. In the above embodiment, the discharge angle θ2 is smaller than the introduction angle θ1. In this way, the discharge angle θ2 is made small, so that the printer 1 can suppress the medium M from being curled on the further downstream side than the intersection X in the conveyance direction. Further, in the above embodiment, the heating element 73 is located on the further downstream side than the intersection X in the conveyance direction. For this reason, the printer 1 can allow the position (width D) Where the medium M comes into contact with the thermal head 7 to deviate toward the downstream side than the intersection X in the conveyance direction. Therefore, the printer 1 can suppress the difference in print quality due to the difference in rigidity of the medium M while suppressing the medium M from being curled on the further downstream side than the intersection X in the conveyance direction.

In the above embodiment, the right and left direction of the printer 1 corresponds to the 'axis direction' of the present disclosure. The rotation center C corresponds to the 'rotation center' of the present disclosure. The medium M corresponds to the 'medium' of the present disclosure. The platen roller 6 corresponds to the 'platen roller' of the present disclosure. The front surface 711 corresponds to the "front surface" of the present disclosure. The back surface 712 corresponds to the "back surface" of the present disclosure. The substrate 71 corresponds to the "substrate" of the present disclosure. The heating element 73 corresponds to the "heating element" of the present disclosure. The heat sink 8 corresponds to the 'heat sink' of the present disclosure. The contact surface 31 corresponds to the "first defining part" of the present disclosure. The contact surface 94 corresponds to the "contact surface" of the present disclosure. The second defining member 9 corresponds to the 'second defining part' of the present disclosure. The protrusion 99 corresponds to the "protrusion" of the present disclosure. The left plate 52 corresponds to the "supporter" of the present disclosure. The shaft 81 corresponds to the "shaft" of the present disclosure. The plurality of compression coils springs 41, 42 and 43 correspond to the 'plurality of springs' of the present disclosure. The discharge angle θ2 corresponds to the 'discharge angle' of the present disclosure. The introduction angle θ1 corresponds to the 'introduction angle' of the present disclosure.

The present disclosure can be changed from the above embodiment. For example, the second defining member 9 may be configured to be a part of the heat sink 8, as an integrated member with the heat sink 8. That is, the second defining member 9 may be integrally formed with the heat sink 8. In this case, the printer 1 can suppress the deviation of the position (width D) where the medium M comes into contact with the medium M, which is caused due to the variation of the components and the variation of the attaching position of the second defining member 9.

The second defining member 9 may be provided as a member other than the heat sink 8. For example, the second defining member 9 may be provided at the case 2. Specifically, the second defining member 9 may be fixed to an inner surface of the upper cover 22 below the discharge slot 25, or may be integrally configured with the upper cover 22. The second defining member 9 may extend from the left plate 52 to the right plate 53 and may be fixed to the left plate 52 and the right plate 53. The second defining member 9 may be fixed to the lower plate 51 and may extend upward from the lower plate 51. The second defining member 9 may be integrally configured with the support plate 5.

The printer 1 may include one or two of the compression coil springs 41, 42 and 43. The printer 1 may further include one or more compression coil springs, in addition to the compression coil springs 41, 42 and 43. For example, one compression coil spring among a plurality of compression coil springs is called a "first spring", and a compression coil spring located at the left of the first spring is called a "second spring". In this case, all the plurality of compression coil springs are preferably configured such that a pressing load of the first spring is larger than a pressing load of the second spring. The plurality of compression coil springs may be configured such that the pressing load of the first spring is larger than the pressing load of the second spring in a relationship between pressing loads of any one pair of compression coil springs. For example, in a case where the pressing load F2 of the compression coil spring 42 is larger than the pressing load. F3 of the compression coil spring 43, the pressing load F1 of the compression coil spring 41 may be the same as the pressing load F2 of the compression coil spring 42 or may be smaller than the pressing load F2 of the compression coil spring 42. The plurality of compression coil springs may be configured such that all the pressing loads are the same or the pressing load of the second spring is larger than the pressing load of the first spring.

The printer 1 may include a spring such as a tension coil spring, a leaf spring and a disc spring, instead of the compression coil springs 41, 42 and 43. For example, the tension coil spring may be provided in the first facing direction with respect to the heat sink 8. The printer 1 may press the heat sink 8 in the first facing direction by an elastic body such as a sponge and a rubber, instead of the compression coil springs 41, 42 and 43.

In the printer 1, the first defining member 3 may be omitted. In this case, the insertion slot 24 may function as the first defining member 3. That is, the insertion slot 24 may define the path on the further upstream side of the conveyance path R than the intersection X in the conveyance direction.

The printer 1 may include one second defining member 9. The printer 1 may include three or more second defining members 9. The plurality of second defining members 9 may be arranged side by side at predetermined intervals in the right and left direction.

The number of protrusions 99 of the second defining member 9 may be one or two, or may be four or more. The protrusion 99 may protrude from the upstream surface 93 of the second defining member 9 toward the upstream side in the conveyance direction. In this case, for example, the operator can fix the second defining member 9 to the upper surface of the heat sink 8 while pressing the protrusion 99 against the downstream end, in the conveyance direction, of the substrate 71 from the downstream side in the conveyance direction.

The discharge angle θ2 may be the same as the introduction angle θ1 or may be larger than the introduction angle θ1. By setting the discharge angle θ2 to be the same as the introduction angle θ1, the printer 1 can cause a center, in the conveyance direction, of the position (width D), where the medium M comes into contact with the thermal head 7, to coincide with the intersection X, or to be closer to the intersection X. Therefore, the printer 1 can further suppress the difference in print quality due to the difference in rigidity of the medium M.

The number of heating elements 73 may be one. The plurality of heating elements 73 may be arranged at the same positions as the intersection X in the conveyance direction, or may be arranged on the further upstream side than the intersection X in the conveyance direction. The plurality of heating elements 73 may be provided in the vicinity of the intersection X in the right and left direction so that they can come into contact with the medium M when the medium M is pressed against the thermal head 7 by the platen roller 6.

The method of fixing the second defining member 9 to the heat sink 8 is not limited to the above embodiment. For example, the jig may not be used. The second defining member 9 may be fixed to the heat sink 8 via an adhesive, or may be fixed to the heat sink 8 by a screw or the like.

The downstream end 311 of the contact surface 31 may be located on the further downstream side than the driver IC 74 in the conveyance direction as long as it is on the further upstream side than the plurality of heating elements 73 in the conveyance direction. In this case, the printer 1 can further suppress the medium M from coming into contact with the driver IC 74.

The shape of the second defining member 9, as seen from a side, is not limited to the trapezoidal shape, and may be a polygonal shape such as another quadrangle shape and a triangular shape. For example, when the second defining member 9 has a triangular shape, as seen from a side, the upstream surface 93 may be omitted. In this case, the upstream end 942 of the contact surface 94 may be connected to the upstream end of the fixed surface 91 in the conveyance direction. The downstream surface 92 may extend toward the downstream side in the conveyance direction as being directed from the downstream end 941 of the contact surface 94 toward the second facing direction. In this case, the downstream end of the medium M comes into contact with the downstream surface 92 when it hangs down after passing through the downstream end 941 of the contact surface 94. In this case, the downstream end of the downstream surface 92 in the conveyance direction is located at the portion of the second defining member 9 where the medium M comes into contact with, i.e., on the most downstream side of the contact surface 94 and the downstream surface 92 in the conveyance direction. The downstream surface 92 may extend toward the upstream side in the conveyance direction as being directed from the downstream end 941 of the contact surface 94 toward the second facing direction. The contact surface 94 may be curved so as to be concave or convex, as seen from a side. The downstream end 941 of the contact surface 94 may be located in the first facing direction or the second facing direction further than the discharge slot 25.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

A first aspect of the disclosure is a printer including a platen roller, a substrate, a heating element, a heat sink, a first defining part, and a second defining part. The platen roller is configured to rotate around a rotation center extending in an axis direction to convey a medium in a conveyance direction intersecting the axis direction. The substrate has a front surface facing the platen roller in a facing direction intersecting the axis direction and the conveyance direction, and a back surface facing opposite to the front surface in the facing direction. A conveyance path of the medium is interposed between the front surface and the platen roller. The heating element provided on the front surface of the substrate, and is configured to come into contact with the medium pressed against the front surface by the platen roller and to perform printing on the medium. The heat sink is configured to be in contact with the back surface of the substrate. The first defining part is provided on a further upstream side than the heating element in the conveyance direction, and is configured to define the conveyance path and to come into contact with the medium at a position further than the front surface in a first facing direction being directed from the front surface toward the platen roller in the facing direction. The second defining part is provided at the heat sink on a further downstream side than the substrate in the conveyance direction, is configured to define the conveyance path, and has a contact surface facing toward the first facing direction and extending from a second facing direction, which is opposite to the first facing direction, toward the first facing direction as being directed from an upstream side toward a downstream side in the conveyance direction. The medium comes into contact with the contact surface. An upstream end of the contact surface in the conveyance direction is located in the second direction further than the front surface. A downstream end of the contact surface in the conveyance direction is located in the first direction further than the front surface.

According to the first aspect, the printer can suppress the position where the medium comes into contact with the substrate from deviating in the conveyance direction by the second defining part. Therefore, the printer can suppress the difference in print quality due to the difference in rigidity of the medium.

In the first aspect, the downstream end of the contact surface in the conveyance direction may be located on a most downstream side, in the conveyance direction, of a portion of the second defining part with which the medium comes into contact. In this case, a distance in the conveyance direction from the position where the medium comes into contact with the substrate to the downstream end of the contact surface in the conveyance direction increases. Therefore, the printer can suppress the deviation of the position where the medium comes into contact with the substrate due to a dimensional variation of the second defining part in the facing direction.

In the first aspect, the second defining part may be provided at the heat sink, separately from the heat sink. In this case, the printer can adjust the position where the medium comes into contact with the substrate by changing the design of the second defining part without changing the design of the heat sink. Therefore, even when the type of medium supported by the printer is different depending on the model, the configuration of the heat sink can be made in common, regardless of the model.

In the first aspect, the second defining part may be configured to be a part of the heat sink, as an integrated part with the heat sink. In this case, the printer can suppress the deviation of the position where the medium comes into contact with the substrate due to the variation of the components and the variation of the attaching position of the second defining part.

In the first aspect, the second defining part may be provided with a protrusion protruding from an upstream end of the second defining part in the conveyance direction toward an upstream side in the conveyance direction, or from a downstream end of the second defining part in the conveyance direction toward a downstream side in the conveyance direction. In this case, for example, when the second defining part is attached to the heat sink, the protrusion is used as a reference, so that an attaching operation becomes easy.

In the first aspect, the printer may further include a supporter, a shaft, and a plurality of springs. The shaft extends in the axis direction, is fixed to the heat sink, and has one end in the axis direction, which is rotatably supported by the supporter, and an other end in the axis direction, which is a free end. The plurality of springs are arranged side by side in the axis direction and press the heat sink in the first facing direction. The plurality of springs include a first spring and a second spring which is located on one side in the axis direction with respect to the first spring. A pressing load of the first spring is larger than a pressing load of the second spring. In this case, the printer can suppress a difference in amount of deformation of the heat sink in the facing direction at each position in the axis direction. Therefore, the printer can suppress the difference in print quality in the axis direction.

In the first aspect, a discharge angle of a third virtual line with respect to the front surface may be smaller than an introduction angle of a second virtual line with respect to the front surface. The third virtual line passes through an intersection of a first virtual line, which passes through the rotation center and extending in the facing direction and the front surface, and a downstream end of the contact surface in the conveyance direction. The second virtual line passes through the intersection and a downstream end of the first defining part in the conveyance direction. The heating element may be located on a further downstream side than the intersection in the conveyance direction. In this case, the printer can suppress the medium from being curled on the further downstream side than the intersection in the conveyance direction by reducing the discharge angle. Since the heating element is located on the further downstream side than the intersection in the conveyance direction, the printer can allow the position where the medium comes into contact with the substrate to deviate toward the downstream side in the conveyance direction. Therefore, the printer can suppress the difference in print quality due to the difference in rigidity of the medium while suppressing the medium from being curled on the further downstream side than the intersection in the conveyance direction.

A second aspect of the disclosure is a printer including a platen roller, a substrate, a heating element, a first defining part, and a second defining part. The platen roller is configured to rotate around a rotation center extending in an axis direction to convey a medium in a conveyance direction intersecting the axis direction. The substrate has a front surface facing the platen roller in a facing direction intersecting the axis direction and the conveyance direction. A conveyance path of the medium is interposed between the front surface and the platen roller. The heating element is provided on the front surface of the substrate and is configured to come into contact with the medium pressed against the front surface by the platen roller and to perform printing on the medium. The first defining part is provided on a further upstream side than the heating element in the conveyance direction, and is configured to define the conveyance path and to come into contact with the medium at a position further than the front surface in a first facing direction being directed from the front surface toward the platen roller in the facing direction. The second defining part is provided on a further downstream side than the substrate in the conveyance direction, is configured to define the conveyance path, and has a contact surface facing toward the first facing direction and extending from a second facing direction, which is opposite to the first facing direction, toward the first facing direction as being directed from an upstream side toward a downstream side in the conveyance direction. The medium comes into contact with the contact surface. An upstream end of the contact surface in the conveyance direction is located in the second direction further than the front surface. A downstream end of the contact surface in the conveyance direction is located in the first direction further than the front surface. A discharge angle of a third virtual line with respect to the front surface is smaller than an introduction angle of a second virtual line with respect to the front surface. The third virtual line passes through an intersection of a first virtual line, which passes through the rotation center and extending in the facing direction and the front surface, and a downstream end of the contact surface in the conveyance direction. The second virtual line passes through the intersection and a downstream end of the first defining part in the conveyance direction. The heating element is located on a further downstream side than the intersection in the conveyance direction.

According to the second aspect, the printer can suppress the medium from being curled on the further downstream side than the intersection in the conveyance direction by reducing the discharge angle. Since the heating element is located on the further downstream side than the intersection in the conveyance direction, the printer can allow the position where the medium comes into contact with the substrate to deviate toward the downstream side in the conveyance direction. Therefore, the printer can suppress the difference in print quality due to the difference in rigidity of the medium while suppressing the medium from being curled on the further downstream side than the intersection in the conveyance direction.

What is claimed is:

1. A printer comprising:

a platen roller configured to rotate around a rotation center extending in an axis direction to convey a medium in a conveyance direction intersecting the axis direction;

a substrate having a front surface facing the platen roller in a facing direction intersecting the axis direction and the conveyance direction, and a back surface facing opposite to the front surface in the facing direction, a conveyance path of the medium being interposed between the front surface and the platen roller;

a heating element provided on the front surface of the substrate, and configured to come into contact with the medium pressed against the front surface by the platen roller and to perform printing on the medium;

a heat sink configured to be in contact with the back surface of the substrate;

a first defining part provided on a further upstream side than the heating element in the conveyance direction, and configured to define the conveyance path and to come into contact with the medium at a position further than the front surface in a first facing direction being directed from the front surface toward the platen roller in the facing direction; and a second defining part provided at the heat sink on a further downstream side than the substrate in the conveyance direction, configured to define the conveyance path, and having a contact surface facing toward the first facing direction and extending from a second facing direction, which is opposite to the first facing direction, toward the first facing direction as being directed from an upstream side toward a downstream side in the conveyance direction, the medium coming into contact with the contact surface, wherein an upstream end of the contact surface in the conveyance direction is located in the second facing direction further than the front surface, and a downstream end of the contact surface in the conveyance direction is located in the first facing direction further than the front surface.

2. The printer according to claim 1, wherein the downstream end of the contact surface in the conveyance direction is located on a most downstream side, in the conveyance direction, of a portion of the second defining part with which the medium comes into contact.

3. The printer according to claim 1, wherein the second defining part is provided at the heat sink, separately from the heat sink.

4. The printer according to claim 1, wherein the second defining part is configured to be a part of the heat sink, as an integrated part with the heat sink.

5. The printer according to claim 1, wherein the second defining part is provided with a protrusion protruding from an upstream end of the second defining part in the conveyance direction toward an upstream side in the conveyance direction, or from a downstream end of the second defining part in the conveyance direction toward a downstream side in the conveyance direction.

6. The printer according to claim 1, further comprising:

a supporter;

a shaft extending in the axis direction, fixed to the heat sink; and having one end in the axis direction, which is rotatably supported by the supporter, and an other end in the axis direction, which is a free end; and a plurality of springs arranged side by side in the axis direction and pressing the heat sink in the first facing direction, wherein the plurality of springs include a first spring and a second spring which is located on one side in the axis direction with respect to the first spring, a pressing load of the first spring being larger than a pressing load of the second spring.

7. The printer according to claim 1, wherein a discharge angle of a third virtual line with respect to the front surface is smaller than an introduction angle of a second virtual line with respect to the front surface, the third virtual line passing through an intersection of a first virtual line, which passes through the rotation center and extending in the facing direction and the front surface, and a downstream end of the contact surface in the conveyance direction, the second virtual line passing through the intersection and a downstream end of the first defining part in the conveyance direction, and the heating element is located on a further downstream side than the intersection in the conveyance direction.

8. A printer comprising:

a platen roller configured to rotate around a rotation center extending in an axis direction to convey a medium in a conveyance direction intersecting the axis direction;

a substrate having a front surface facing the platen roller in a facing direction intersecting the axis direction and the conveyance direction, a conveyance path of the medium being interposed between the front surface and the platen roller;

a heating element provided on the front surface of the substrate and configured to come into contact with the medium pressed against the front surface by the platen roller and to perform printing on the medium;

a first defining part provided on a further upstream side than the heating element in the conveyance direction, and configured to define the conveyance path and to come into contact with the medium at a position further than the front surface in a first facing direction being directed from the front surface toward the platen roller in the facing direction; and a second defining part provided on a further downstream side than the substrate in the conveyance direction, configured to define the conveyance path, and having a contact surface facing toward the first facing direction and extending from a second facing direction, which is opposite to the first facing direction, toward the first facing direction as being directed from an upstream side toward a downstream side in the conveyance direction, the medium coming into contact with the contact surface, wherein an upstream end of the contact surface in the conveyance direction is located in the second facing direction further than the front surface, a downstream end of the contact surface in the conveyance direction is located in the first facing direction further than the front surface, a discharge angle of a third virtual line with respect to the front surface is smaller than an introduction angle of a second virtual line with respect to the front surface, the third virtual line passing through an intersection of a first virtual line and the front surface, and through the downstream end of the contact surface in the conveyance direction, the first virtual line passing through the rotation center and extending in the facing direction, the second virtual line passing through the intersection and a downstream end of the first defining part in the conveyance direction, and the heating element is located on a further downstream side than the intersection in the conveyance direction.

* * * * *